United States Patent [19]

Livesey-Goldblatt

[11] 4,293,530

[45] Oct. 6, 1981

[54] RECOVERY OF GOLD AND URANIUM FROM CALCINES

[75] Inventor: Eric Livesey-Goldblatt, 7 MacKenzie St., Florida Park, Roodepoort, Transvaal Province, South Africa

[73] Assignee: Eric Livesey-Goldblatt, Florida Park, South Africa

[21] Appl. No.: 952,175

[22] Filed: Oct. 17, 1978

[30] Foreign Application Priority Data

Oct. 24, 1977 [ZA] South Africa ............... 77/6320

[51] Int. Cl.$^3$ .............................................. C01G 43/00
[52] U.S. Cl. ........................................ 423/18; 423/20; 423/29
[58] Field of Search ............................. 423/18, 20, 29

[56] References Cited

U.S. PATENT DOCUMENTS

| | | | |
|---|---|---|---|
| 2,737,438 | 3/1956 | Gaudin ............................. | 423/18 |
| 2,797,977 | 7/1957 | Forward et al. .................. | 423/18 |
| 2,838,369 | 6/1958 | Gaudin et al. .................... | 423/18 |
| 2,894,809 | 7/1959 | McCullough et al. ............ | 423/18 |
| 2,925,321 | 2/1960 | Mariacher ........................ | 423/20 |
| 3,092,447 | 6/1963 | Legge et al. ...................... | 423/18 |
| 3,273,972 | 9/1966 | Campbell et al. ................ | 423/18 |
| 3,341,303 | 9/1967 | Berri et al. ....................... | 423/18 |

*Primary Examiner*—Edward A. Miller
*Attorney, Agent, or Firm*—Ladas & Parry

[57] ABSTRACT

The invention concerns the recovery of non-ferrous metals, such as gold, uranium or the like from iron oxide containing calcines which have the non-ferrous metal present in solid solution and/or encapsulated within the iron oxide. The calcine is reacted, while stirring vigorously, with sulphuric acid or another strong inorganic acid to cause the iron to form the ferric salt. The material obtained is mixed with water and the liquid and solid phases are separated from each other. The non-ferrous metal is then obtained from at least one of these phases by leaching, or the like.

1 Claim, 3 Drawing Figures

RECOVERY OF GOLD AND URANIUM FROM CALCINES

FIELD OF THE INVENTION

This invention relates to a process for the recovery of useful materials from calcines.

BACKGROUND TO THE INVENTION

We are aware that when a metal bearing sulphide (e.g. a pyrite or arsenopyrite) is roasted, preferably after having been subjected to flotation, it is converted to a calcine. The calcine comprises mainly an iron oxide (ferric oxide) together with silica and some alkaline metal oxides with substantially no sulphide. The bulk of precious metal or any uranium which has been present in the sulphide can be recovered by leaching. However, some undissolved valuable metals are retained in the calcine. They may be retained due to being partially or completely encapsulated within iron oxide particles or by being in a solid solution within the crystals of iron oxide of the calcine. In either case, we are not aware of any practical commercial process for the recovery of such precious metals or uranium from the calcine. A complete breakdown of the iron oxide particle is first necessary before leaching, or the like can be carried out.

In mine dumps at Barberton in South Africa, the calcine waste from gold extraction can contain up to 20 grams of gold per ton of calcine as a presently unleachable refractory material. Other calcines may also contain uranium and other metals. It would be desirable to be able to extract these materials from the calcine.

We have now invented a process by which about 90% of the gold may be extracted and a high proportion of uranium.

SUMMARY OF THE INVENTION

The present invention provides a process for the recovery of non-ferrous metals from iron oxide-containing calcines which contain the non-ferrous metal encapsulated within and/or in solid solution within iron oxide, said process comprising the steps of '(i) reacting the calcine with a strong inorganic acid in the liquid phase while agitating the reaction mixture for sufficient time for substantially all of the iron present to form a water soluble iron salt, (ii) admixing water with the reaction mixture, (iii) separating the liquid and solid phases from each other, and (iv) recovering non-ferrous metals from one or both phases.

Conveniently, the inorganic acid is sulphuric acid, so that at least the iron oxide present is converted to the sulphate. However nitric or hydrochloric acid may, for example, alternatively be used. Generally the ferric oxide is converted to ferric sulphate by the treatment with sulphuric acid. Immediate reaction takes place on mixing. The concentration of the sulphuric acid can be adjusted as necessary to given an optimum result. Standard concentrated sulphuric acid, to which a small amount of water has been added, may be used. The amount of water may be up to about 10% by volume of the total, conveniently about 7%. Strong agitation conveniently is applied. The reaction can initially be effected by mixing the reactants at ambient temperatures. The heat of reaction will lead to a temperature of about 150° to 200° C. being obtained. The reaction mixture can then be heated, if desired, to complete the reaction. Temperatures of up to about 580° C., conveniently up to 500° C. may be used to complete the reaction. This heating is referred to as 'low temperature roasting.'

The sulphuric acid treatment causes the following reaction to take place.

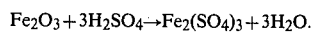

$$Fe_2O_3 + 3H_2SO_4 \rightarrow Fe_2(SO_4)_3 + 3H_2O.$$

At the same time, at least some of the metal oxides present may also be converted to their sulphates. As the iron oxide has been converted to its soluble sulphate the metals are no longer encapsulated or in solid solution and so can be separated from the product formed.

When the calcine contains gold, the product obtained after treatment with the acid can be roasted. The product may be in the form of a paste which can be heated at temperatures of up to about 800° C. to decompose the metal salts, such as ferric sulphate, back to the metal oxide. The re-formed iron oxide no longer encapsulates the valuable metal or retains it in solid solution. Gases from the roasting may be scrubbed, e.g. with dilute sulphuric acid to provide concentrated sulphuric acid which may be recycled to the mixing step.

The invention enables a previously rejected and waste product to be used for providing valuable metals. Once the waste product, the calcine, has been treated to free the metal from encapsulation and/or retention in solid solution, the valuable metal may be obtained therefrom. The actual steps involved in obtaining the metal will depend on the metal concerned and the processes, such as leaching, ion exchange, solvent extraction, etc, available.

However, after the roasting (if carried out) or after substantial complete reaction of the calcine with the acid (if no 'low temperature' or higher temperature roasting was effected) the product obtained on treatment with the acid is mixed with water and the liquid and solid phases are separated. If gold is present, the solid phase can be treated, e.g. with an alkali metal cyanide, to separate the gold. If uranium is present, the liquid phase can be treated, e.g. using a ferric salt to separate the uranium. If both these metals are present, economic considerations may make it advisable for both the liquid and solid phases to be treated. The actual treatment conditions may be those known in the art for the separation of the metals concerned.

For example, in the case of gold, the solid filter cake may be crushed then slurried with water and lime and thereafter leached with potassium cyanide. The leached slurry can be filtered and the cake washed, pulped, rewashed and dried. In the case of uranium, any suitable procedure may be used for separating the uranium from the filtrate obtained on mixing the acid-treated calcine with water. For example, a ferric leach using ferric sulphate can be carried out and the uranium obtained from a diluted solution by ion-exchange, solvent extraction, or the like. Reference may also be had to procedures described in the patent or scientific literature for separating uranium from solution, e.g. U.S. Pat. Nos. 2,737,438 (Gaudin), 2,866,680 (Long) and 3,065,045 (Chuko) as well as to:

(a) Uranium in South Africa 1946–56 volume 2 pages 68 to 84 where the chapter by R. E. Robinson is entitled 'The Chemistry of the ion-exchange process for the extraction of Uranium from Rand Leach Liquors.'

(b) The Proceedings of the second United Nations International Conference on the Peaceful uses of atomic energy held in Geneva on 1st to 13th September 1958 Volume 3 pages 427 to 443 entitled 'Application of ion exchange to the recovery of uranium from sulfuric digestion solutions of the mineral of the Venta de Cardera, Cordoba.'

(c) Journal of the South African Institute of Mining and Metallurgy, March 1966, pages 342 to 356 entitled 'Amine solvent extraction of uranium from sulphuric acid eluates,' and (d) The extractive Metallurgy of Uranium by Robert C. Merrit of the Colorado School of Mines Research Institute under contract with the U.S. Atomic Energy Commission, pages 147 to 216. Anion exchange resins referred to include Amberlite®IRA-200 and Dowex®.

In one particular embodiment of obtaining the desired metal it may form a sulphate which is soluble in water. The sulphated calcine can be leached with water, and/or aqueous ferric sulphate whereby the ferric sulphate and soluble metal sulphate will pass into solution. The solution can be separated from the solid material, and the metal then can be separated from the solution. This embodiment can be used when uranium may be present in the calcine. The uranium will form the soluble sulphate on treatment with concentrated sulphuric acid at about 500° C. Leaching of the sulphate mixture with water yields a ferric/uranium sulphate solution. This solution may be supplied to a uranium extraction plant where it can be used to extract uranium from an ore, with simultaneous recovery of some of the uranium from solution. The uranium can be obtained as a yellow cake. The residue may be washed with water and cyanided to recover any gold present.

In a second embodiment for obtaining a desired metal, the calcine is mixed with concentrated sulphuric acid and agitated. A hard grey mass may be formed. This mass of sulphated calcine can be roasted at elevated temperatures, e.g. at 720° to 800° C. to re-convert the ferric sulphate present back to ferric oxide, with the evolution of sulphur trioxide, as follows:

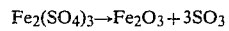

$$Fe_2(SO_4)_3 \rightarrow Fe_2O_3 + 3SO_3$$

The $SO_3$ gas can be converted to sulphuric acid in an absorber of a type normally found in conventional sulphuric acid plants. The sulphuric acid formed can be re-cycled to sulphate further calcine. We have found that the reconstituted iron oxide formed by roasting does not affect gold released on the sulphation of the ferric oxide. The gold can be recovered by cyanidation of the reconstituted (i.e. sulphated and then roasted) calcine containing, for example, silica. After cyanidation of this calcine and washing, the iron oxide product is of such enhanced purity that it can be used as a paint pigment.

The calcine starting material used in the process of the invention may be any suitable calcine containing iron oxide. Examples are calcines available on mine dumps, e.g. at Barberton and elsewhere in the Republic of South Africa and which contain gold and, often, uranium as well.

DETAILED DESCRIPTION OF PREFERRED EMBODIMENTS

Figure 1:
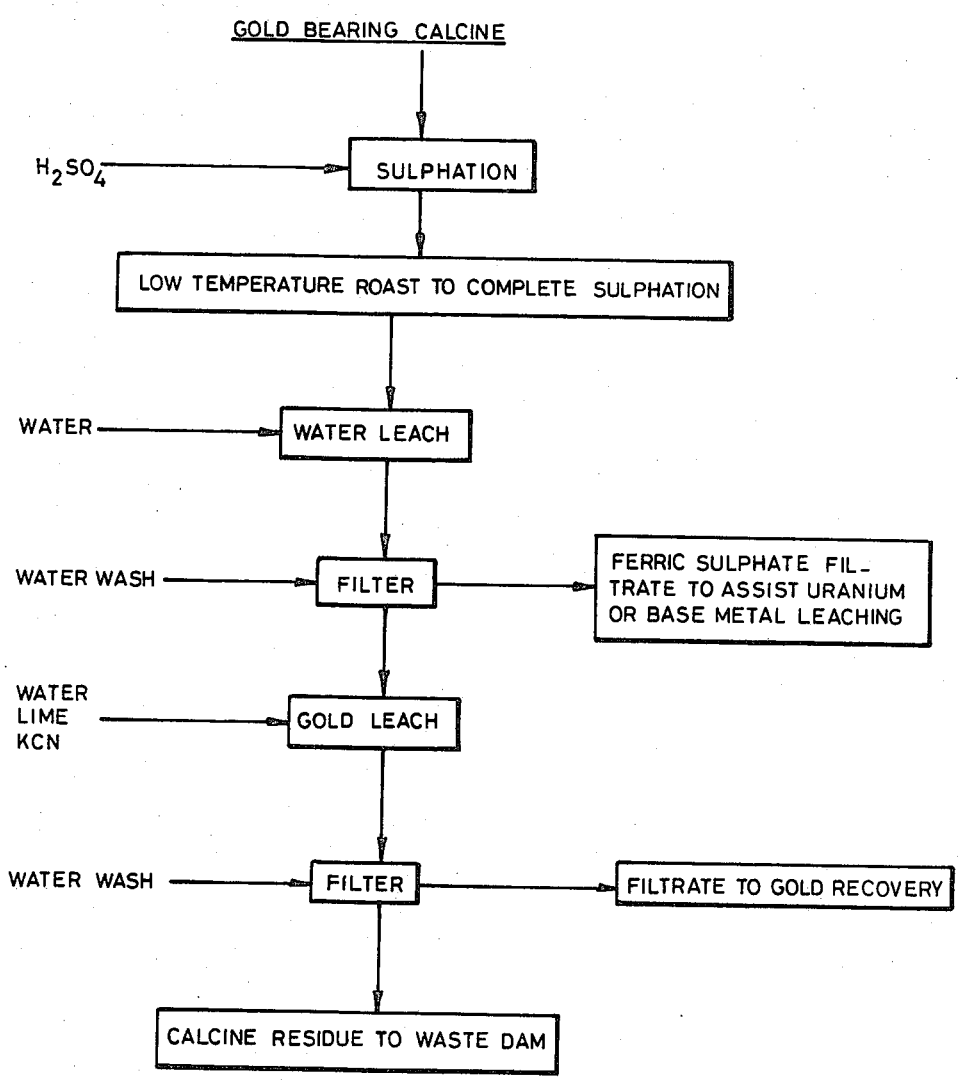
FIG. 1 is a flow sheet of the first embodiment of the invention.
Figure 2:
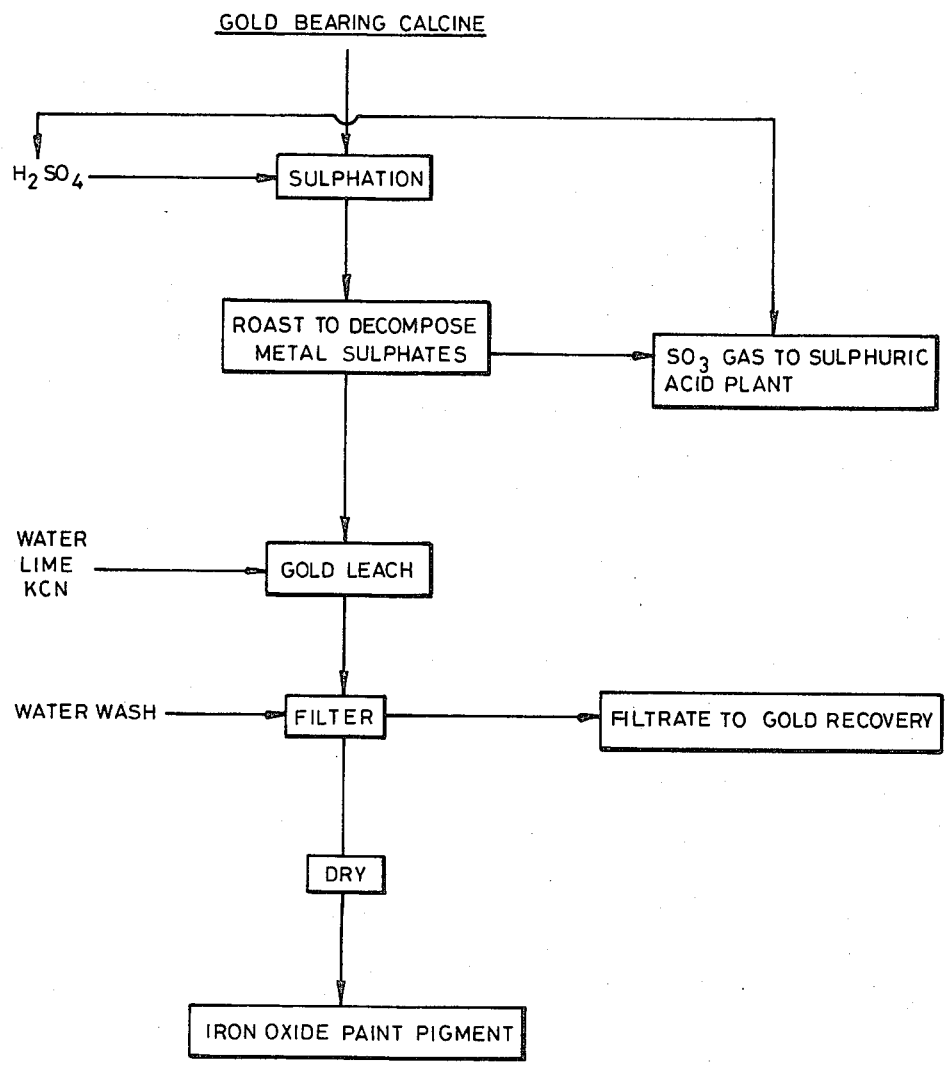
FIG. 2 is a flow sheet of the second embodiment of the invention.
Figure 3:
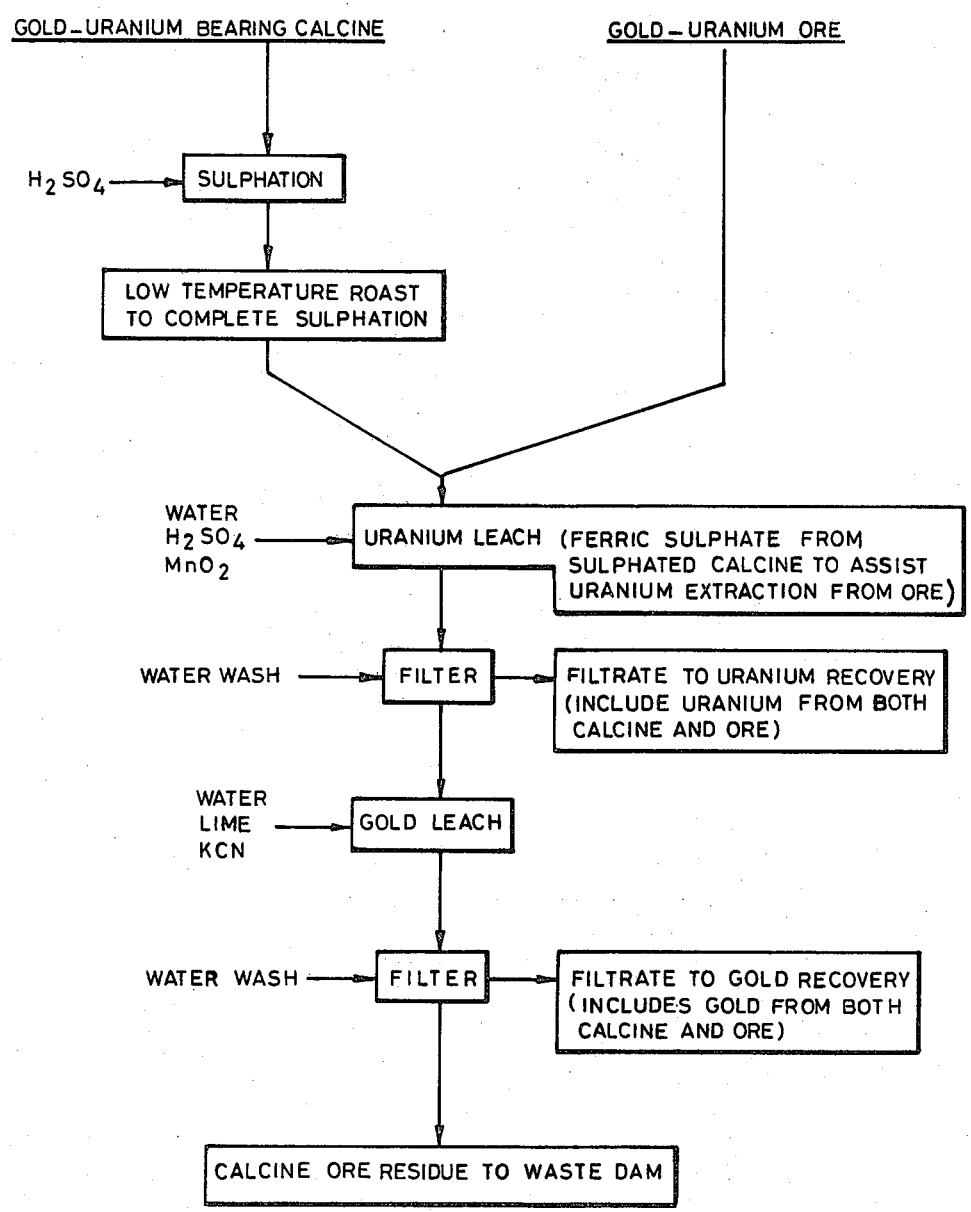
FIG. 3 is a flow sheet of a modification of the first embodiment in which the sulphated calcine is mixed with a South African gold-uranium ore so that the ferric sulphate assists in the extraction of the uranium, and the uranium is recovered as well as the gold in the ore.

The invention is illustrated by reference to the following non-limiting Examples. Examples 1 and 2 are used on a calcine formed from a gold bearing arsenopyrite ore and Examples 3 to 5 are used on a calcine formed from gold and uranium bearing ore. FIGS. 1 to 3 relate, respectively, to Examples 1 to 3.

EXAMPLE 1

(i) A calcine of the following composition and typical of that obtained from the roasting of a gold bearing arsenopyrite (uranium absent) was used.

| Constituents | % |
|---|---|
| $Fe_2O_3$ | 65,52 |
| $FeS_2$ | 0,97 |
| $Al_2O_3$ | 5,00 |
| MgO | 1,55 |
| CaO | 1,05 |
| $K_2O$ | 1,36 |
| Na, Ti, Cu, Mn, Cr, oxides | 1,04 |
| $SiO_2$ | 23,10 |
| Moisture | 0,41 |
| Gold | 20,3 g/ton |
| Silver | 6,0 g/ton |
| Sieve size | |
| +0,074 mm | 36,4 |
| −0,074 mm | 63,6 |

(ii) Sulphuric acid of 93% $H_2SO_4$ and 7% water was obtained from an opening sulphuric acid plant. 1.0 part calcine was added to 1.5 parts of sulphuric acid. The physical reaction observed was as follows:

| Minutes | Temperature °C. | Appearance |
|---|---|---|
| 1 | 53 | Thin red slurry |
| 2 | 75 | Thin red slurry |
| 3 | 130 | Thin red slurry |
| 4 | 139 | Thin red paste |
| 5 | 153 | Paste |
| 6 | 159 | Soft red grey solid |
| 7 | 165 | Soft red grey solid |
| 8 | 168 | Soft red grey solid |
| 9 | 171 | Soft red grey solid |
| 10 | 172 | Soft red grey solid |
| 11 | 174 | Soft grey solid |
| 15 | 179 | Hard grey solid |
| 20 | 179 | Hard grey solid |
| 25 | 175 | Very grey hard - can be sliced off in flakes. |

(iii) The grey hard mass was thereafter crushed to 0.5 cm and heated to 500° C., whereupon some moisture and sulphur oxide gases were evolved.

(iv) Water equivalent to 1.5 times the weight of solid was added to the mass and the mixture agitated for one hour, filtered and washed. The filtrate was used to extract uranium from an ore in a process of the type commonly referred to as a ferric leach.

(v) Water was added to the washed filter cake to give a 1:1 liquid/solid slurry. Lime was added and the slurry aerated with agitation for 4 hours. Cyanide (as KCN)

was added and the leach continued for 16 hours with aeration. The leached slurry was filtered, the cake washed, repulped, rewashed, dried and assayed. The difference in gold content of the residue before and after cyanidation gave the gold extracted. The data is tabulated as follows:

| | |
|---|---|
| Calcine weight | 2,0 kg |
| Calcine gold value | 20,3 g Au/ton |
| Sulphuric acid weight | 3,5 kg |
| Sulphuric acid analysis | 93,0% $H_2SO_4$ |
| Max. temp. of sulphation | 179° C. |
| Roast temp. to complete sulphation | 500° C. |
| Weight of roast product for water leach | 5,2 kg |
| Water weight added | 8,1 kg |
| Water wash | 8,1 kg |
| Wet weight of water leached residue | 0,75 kg |
| | (0,6 kg) |
| Weight of filtrate and washings | 16,05 kg |
| Iron content of filtrate and washings | 56,7 g/l |
| Gold value of dry water leached residue | 67,67 g Au/ton |
| | (dry) |
| Water added to leached residue | 0,45 kg |
| Lime added | 25,0 kg CaO/ton |
| Cyanide added | 10,0 kg KCN/ton |
| Lime consumed | 22,45 kg CaO/ton |
| Cyanide consumed | 1,20 kg KCN/ton |
| Weight of filtrate and washings | 1,7 kg |
| Dry weight of cyanided residue | 0,6 kg |
| Gold value of dry residue | 6,06 g Au/ton |
| Gold dissolved | 61,61 g Au/ton |
| Recovery | 91,04% |

A flow sheet of this first procedure is illustrated in FIG. 1.

EXAMPLE 2

The procedure is identical to that of Example 1, up to step (iii).

(iv) The sulphated mass was roasted at 720° C. until there was no further evolution of $SO_3$ gas.

(v) The gas was absorbed in dilute sulphuric acid solution to form a concentrated acid (for recycling).

(vi) The roasted product was pulped with an equal weight of water. Lime was added and the slurry aerated with agitation for 4 hours. Cyanide (as KCN) was added and the leach continued for 16 hours with aeration. The leached slurry was filtered, the cake washed, repulped, rewashed, dried and assayed. The difference in gold content of the residue before and after cyanidation gave the gold extracted.

(vii) The data is tabulated as follows:

| | |
|---|---|
| Calcine weight | 2,0 kg |
| Calcine gold value | 20,3 g Au/ton |
| | (0,0406 gm) |
| Sulphuric acid weight | 3,5 kg |
| Sulphuric acid analysis | 93,0% $H_2SO_4$ |
| Sulphuric acid added 100% $H_2SO_4$ | 3,26% $H_2SO_4$ |
| Max. temp. of sulphation | 179° C. |
| Decomposition Roast temperature | 120° C. |
| Weight of roast product | 1,98 kg |
| Gold value of roast product | 20,5 g Au/ton |
| Water added to roast product | 2,0 kg |
| Lime added | 3,0 kg CaO/ton |
| Cyanide added | 1,5 kg KCN/ton |
| Lime consumed | 2,5 kg CaO/ton |
| Cyanide consumed | 1,1 kg KCN/ton |
| Weight of filtrate and washings | 5,5 kg |
| Dry weight of cyanide residue | 2,00 kg |
| Gold value of dry residue | 0,75 g Au/ton |
| Gold dissolved | 19,75 g Au/ton |
| Gold recovery | 96,35% |
| Iron oxide paint pigment | 1,0 kg |
| Recovery | 100% |
| Sulphuric acid recovered | 3,10 kg |
| Acid recovery | 95,1% |

A flow sheet of this second procedure is illustrated in FIG. 2.

EXAMPLE 3

A calcine of the following composition and typical of that obtained from roasting a gold and uranium bearing pyrite was used.

| Constituents | % |
|---|---|
| $Fe_2O_3$ | 45,01 |
| $Al_2O_3$ | 3,20 |
| MgO | 1,52 |
| CaO | 2,50 |
| Na, K, Ti, Cu, Mn, Cr, Oxides | 1,00 |
| $SiO_2$ | 46,77 |
| Moisture | Nil |
| Gold | 6,3 g/ton |
| Silver | 0,6 g/ton |
| $U_3O_8$ | 0,40 kg/ton |
| Sieve size | |
| +0,074 mm | 70 |
| −0,074 mm | 30 |

(i) Sulphuric acid of 93% $H_2SO_4$ was obtained from an operating plant.

(ii) 1.0 part of calcine was added to 1.5 parts of hot 50° C. to 80° C. sulphuric acid. The physical reaction was similar to that given in Example 1(ii).

(iii) The grey hard mass formed was crushed to 0.5 cm and heated to 500° C. Some moisture and sulphur oxide gases were evolved.

(iv) The crushed grey solid was added to 1.5 times the weight of water and the mixture agitated for one hour, filtered and washed (assay of filtrate and washings showed 98 percent of the uranium had been extracted from the ore).

(v) The uranium bearing filtrate was used to extract uranium from an ore in a process that is commonly referred to as a ferric leach. In this well known procedure leaching with a ferric salt was carried out followed by separation of the uranium by ion-exchange.

(vi) Water was added to the washed cake to give a 1:1 liquid/solid slurry. Lime was added and the slurry aerated with agitation for 4 hours. Cyanide (as KCN) was added and the leach continued for 16 hours with aeration. The leached slurry was filtered, the cake washed, repulped, rewashed, dried and assayed. The difference in gold content of the residue before and after cyanidation gave the gold extracted.

(vii) The data is tabulated as follows:

| | |
|---|---|
| Calcine weight | 1,0 kg |
| Calcine gold value | 11,6 g/Au/ton |
| Calcine uranium value | 0,4 kg $U_3O_8$/ton |
| Sulphuric acid weight | 1,76 kg |
| Sulphuric acid analyses | 93,0% $H_2SO_4$ |
| Sulphuric acid temperature | 60° C. |
| Max. temperature of sulphation | 185° C. |
| Roast temperature to complete sulphation | 500° C. |
| Weight of roast product for water leach | 2,65 kg |
| $U_3O_8$ value of roast product water weight added | 0,15 kg $U_3O_8$/ton 2.7 kg |

| -continued | |
|---|---|
| Water wash | 2,7 kg |
| Wet weight of water leached residue | 0,68 kg |
| Weight of filtrate plus washings | 5,24 kg |
| iron content of filtrate | 57,2 g Fe/l |
| Uranium content of filtrate | 0,076 g $U_3O_8$/l |
| Gold value of dry water leached residue | 11,6 g Au/ton |
| Uranium value of dry water leached residue | Trace |
| Water added to leached residue | 0,40 kg |
| Lime added | 25,0 kg CaO/ton |
| Cyanide added | 10,0 kg KCN/ton |
| Lime consumed | 20,0 kg CaO/ton |
| Cyanide consumed | 1,5 kg KCN/ton |
| Dry weight of cyanided residue | 0,54 kg |
| Gold value of dry residue | 1,20 g Au/ton |
| $U_3O_8$ value of dry residue | Trace |
| Gold dissolved | 10,4 g Au/ton |
| Gold recovery | 89,7% |
| Uranium dissolved | 0,40 gram |
| Uranium recovery | 100% |

A flow sheet of this procedure is given in FIG. 1.

EXAMPLE 4

In this Example (and in Example 5), reaction of the calcine and the sulphuric acid was carried out in a 'Nautamixer' sold by Mixprocess (Pty) Limited of Vereeniging, Transvaal. In this apparatus, a conical reaction chamber has a mixing screw within it extending from top to bottom, the mixing screw enables high torques to be obtained.

Dimensions of the mixer used for these tests are as follows:

| Height | cm ca. 2 meter |
|---|---|
| Top diameter | cm ca. 2 meter |
| Bottom diameter - discharge point | cm ca. 0,3 meter |
| Volume | Liter 200 |
| Rate of screw rotation | r.p.m. 120 |
| Rate of screw arm peripheral rotation | r.p.m. 4 |
| Power to screw mixer | kW 55 |
| Power to screw arm | kW 1,5 |

The procedure was carried out on a calcine composed mainly of iron oxide and silica and with 8.1 grams of gold per ton and 0.0425 kg of $U_3O_8$ per ton, present in solid solution in the calcine and encapsulated therein.

The procedure carried out was as follows:

(i) 194 kg of 98% sulphuric were placed in the mixer and the screw arm and mixer set in motion with the direction of the screwing motion moving from top to bottom.

(ii) 131 kg of the powdered calcine (80%-200 mesh) containing 0.5% moisture were added to the sulphuric acid over a period of 2 minutes.

(iii) After about 3 minutes the slurry began to get hot. Over the next 15 minutes the red coloured slurry gradually turned grey and changed from a thin slurry to a paste. At this stage the paste had a temperature of 180° C.

(iv) The bottom part of mixer was opened and at the same time the direction of the screw was changed to screw from top to bottom thereby forcing out the paste into a suitable container.

(v) The paste then hardened with the temperature drop to ca. 160° C.

(vi) The hardened mass was placed in a furnace and roasted at 600° C. for 30 minutes. Unreacted sulphuric fumes given off were collected by adsorption in dilute sulphuric acid, which was correspondingly increased in strength and recycled to sulphate more calcine.

(vii) The hot mass of ferric sulphate was mixed directly with water and the slurry agitated.

(viii) After 60 minutes all the ferric sulphate had dissolved and the residue was filtered off.

(ix) The filtrate was assayed and found to contain 90.0% of the iron and 96.5% of the uranium.

(x) The residue was neutralised with lime and leached with cyanide. Assay of the residue showed that 89% of the gold had been leached out by the cyanide solution.

EXAMPLE 5

The procedure of Example 4 was repeated, but in this test the powdered calcine was loaded into the 'Nautamixer' and the concentrated sulphuric acid added to the calcine over a period of 2 minutes.

Reaction rates, slurry change behaviour and extraction of metals were substantially the same as those used in Example 4.

I claim:

1. A process for the recovery of gold and uranium from calcines which contain gold and uranium encapsulated within and/or in solid solution within iron oxide, said process comprising the steps of
    (i) reacting the calcine with strong sulfuric acid in the liquid phase while agitating the reaction mixture for sufficient time for substantially all of the iron present to form a water soluble iron sulphate,
    (ii) roasting the reacted calcine at a temperature of from 150° to 720° C.,
    (iii) admixing water with the roasted product,
    (iv) separating the liquid and solid phases from each other,
    (v) recovering gold from the solid phase by treatment of the said solid phase with an alkali metal cyanide, and
    (vi) recovering uranium from the liquid phase.

* * * * *